May 17, 1938.  E. D. WILLIAMSON  2,117,642
ELECTRIC MOTOR AND MEANS FOR CONTROLLING THE SAME
Original Filed April 13, 1935
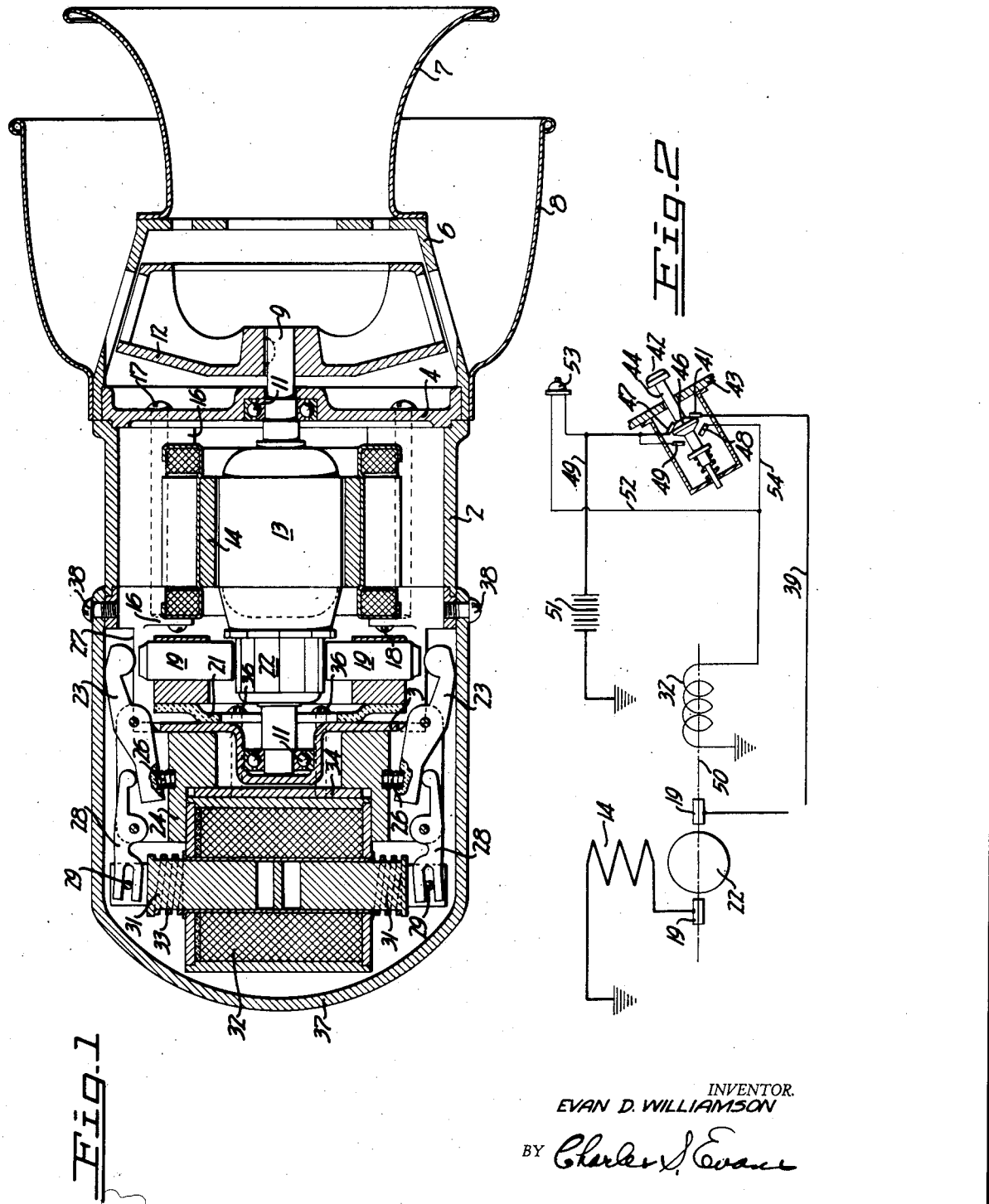
INVENTOR.
EVAN D. WILLIAMSON
BY Charles S. Evans
HIS ATTORNEY.

Patented May 17, 1938

2,117,642

UNITED STATES PATENT OFFICE 2,117,642

ELECTRIC MOTOR AND MEANS FOR CONTROLLING THE SAME

Evan D. Williamson, San Francisco, Calif., assignor to E. D. Bullard Company, San Francisco, Calif., a corporation of California Original application April 13, 1935, Serial No. 16,202. Divided and this application November 16, 1936, Serial No. 110,994

5 Claims. (Cl. 172—179)

This is a division of my copending application, Serial No. 16,202, filed April 13, 1935.

My invention relates to motor operated devices, such as electric sirens; and the broad object of my invention is to provide an electric motor and control system whereby the motor brushes are employed optionally to close the motor circuit or ride the commutator with the circuit open to provide a brake.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a horizontal sectional view of a siren embodying the improvements of my invention; and Figure 2 is a wiring diagram showing the control circuit.

In terms of broad inclusion, the electric motor and control system embodying my invention comprises a motor having its brushes normally out of engagement with the commutator, a circuit for energizing the motor through the brushes, means for pressing the brushes against the commutator to close the circuit through the motor, means apart from the brushes for opening the circuit, and means for pressing the brushes against the commutator while the circuit is open to provide a brake.

In greater detail, and referring particularly to Figure 1 of the drawing, the siren chosen for purposes of illustration and embodying the improvements of my invention comprises a split housing having a forward cylindrical portion 2 and a cup-shaped rear portion 3. An end plate 4 is provided on the forward end of the housing, upon which the sounding unit is mounted. The latter unit comprises a ported casing 6 carrying sound deflectors and projectors 7 and 8. A shaft 9 is journaled in the end portion 3 of the housing and in the forward end plate 4 in suitable bearings 11, and carries on its forward projecting end the sounding rotor 12 arranged within the ported casing 6.

The shaft 9 also carries the armature 13 of the motor which drives the siren. By this arrangement a single rotating element is provided, having a minimum of frictional resistance, and capable of rotating for a considerable period of time after the current to the motor has been cut off. The field 14 of the motor is clamped between the two halves of the split housing, and is held by lugs 16 projecting inwardly from the housing wall. The several elements are held in assembled relation by screws 17 extending through the end plate 4 and threaded in the outer lugs 16. The field 14 is also preferably fastened to the outer lugs 16 by suitable screws 18 so that when the assembly screws 17 are withdrawn, the field 14 will be dismantled as a part of the outer housing portion 3.

The brushes 19 are mounted in a suitable holder 21 so that the brushes may slide freely toward and away from the commutator 22. Each brush is pressed against the commutator by a lever 23 pivoted on a mounting block 24 and having a spring 26 compressed between the block and the rear end of the lever. Suitable slots 27 cut in the wall of the rear housing portion 3 provide openings whereby the forward ends of the levers 23 may contact the brushes 19. The levers 23 are preferably made of an insulating material, such as condensate composition.

Means are provided for removing the spring pressure from the brushes to stop the flow of current to the armature and to simultaneously relieve the armature of the brush drag on the commutator. By relieving the armature of this frictional drag when the current is cut off, the armature 13 and connected sounding rotor 12 are free to spin and the inertia of these parts will maintain the signal for a considerable period after the motor has been de-energized. The means for removing the spring pressure from each brush preferably comprises a second pair of levers 28, also pivoted on the mounting block 24. The forward ends of these levers bear on the rear portions of the brush levers 23 opposite the springs 26. The rear ends of the levers 28 are slotted to engage pins 29 on plungers 31.

These plungers are of magnetic material and project into the ends of a solenoid 32, and control springs 33 are compressed between the outer ends of the plungers and the ends of the solenoid. When the solenoid is energized (by a suitable circuit controlled by the operator) the plungers 31 are simultaneously drawn inwardly against the action of the control springs 33. This movement shifts the levers 28 out of engagement with the brush levers 23 so that the latter are free to exert their full spring loaded pressure on the brushes. The control spring therefore does not interfere with the adjusted spring pressure on the brushes. At this time the motor operates to sound the siren in the usual manner.

When the solenoid is de-energized the control springs 33 are released to drive the plungers 31 outwardly, which causes the levers 28 to bear downwardly on the outer ends of the spring pressed levers 23. Under these conditions the pressure is relieved from the brushes and the latter are automatically thrown outwardly from the rotating commutator. This cuts off the current to the armature, while at the same time relieves the latter of the frictional drag on the commutator. The subsequent free running of the armature and connected sounding rotor 12 will maintain the signal for an appreciable length of time.

The solenoid 32 is preferably mounted on a plate 34 which lies against the base of a recess provided in the rear end of the mounting block 24. Suitable screws 36 passing through the brush holder 21, housing portion 3 and mounting block 24, and threaded into the plate 34, operate to hold all of these parts in assembled relation. A cup-shaped casing 37 is preferably provided for this external mechanism and is suitably secured to the housing as by the screws 38.

Figure 2 shows a wiring diagram embodying my improved motor control. In this circuit one side of the motor field is grounded and the other side is connected to one of the brushes 19; these brushes being shown in their normal position away from the commutator 22. The other brush is connected by a lead 39 to contact 41 of a switch 42 mounted on the floor board 43. This switch comprises a spring pressed plunger 44 having a contactor 46 normally bridging the contacts 41 and 47. Two other contacts 48 and 49 are positioned so that when the plunger 44 is pressed inwardly the contactor 46 will close a circuit through them; it being understood that when the contactor is bridging the inner contacts it is away from the outer contacts 41 and 47, so that the circuit through the latter is open.

The outer contact 47 is connected by a lead 49 to the ungrounded side of the automobile battery 51. This completes the primary circuit through the siren motor, and whenever this circuit is closed by pressing the brushes against the commutator the motor will operate. The brushes are allowed to press against the commutator when the solenoid 32 is energized, as was described in detail in connection with Figure 1. In Figure 2 the operative connection between the solenoid and brushes is indicated by the dot and dash line 50. The solenoid 32 has one side grounded and has its other end connected by a lead 52 to the battery 51. A push button 53, conveniently positioned near the hand of the driver is interposed in this lead. When the button 53 is pressed therefore, the solenoid 32 is energized to allow the brushes to be pressed against the commutator and start the motor. The motor will then keep running as long as the push button 53 is held closed.

When the push button 53 is released the pressure on the brushes is removed and the motor circuit is opened. The motor armature will then run freely and continue the signal until the inertia of the moving parts is overcome. This continued signal is often desired. On occasion however, it is desirable to stop the signal promptly after the motor is de-energized. For this purpose brake means are provided for stopping the armature. In my improved siren, the brushes themselves are used to provide the braking resistance. As shown in Figure 2, the solenoid 32 is also connected by a lead 54 to the lower contact 48 of the switch 42; the other lower contact 49 being connected to the battery.

When the switch 42 is pressed inwardly the secondary circuit is closed and the solenoid is again energized to allow the brushes to press against the commutator. At this time, however, the primary circuit is broken by the contactor 46, so that the brushes 19 merely function as friction resistance elements. The braking action of the brushes will of course apply as long as the switch 42 is held in.

I claim:

1. An electric motor having its brushes normally out of engagement with the commutator, a primary circuit for energizing the motor through the brushes, electrically controlled means for pressing the brushes against the commutator and for removing the contact pressure of the brushes from the commutator, a secondary circuit for energizing the last mentioned means, a switch for optionally closing either the primary circuit or the secondary circuit, and a separate switch for closing the secondary circuit.

2. An electric motor having its brushes normally out of engagement with the commutator, a primary circuit for energizing the motor through the brushes, electrically controlled means for pressing the brushes against the commutator and for removing the contact pressure of the brushes from the commutator, a secondary circuit for energizing the last mentioned means, a switch normally closing the primary circuit and operable to open the primary circuit and close the secondary circuit, and a separate switch for closing the secondary circuit when the primary circuit is closed.

3. In an electric motor having its brushes normally out of engagement with the commutator, a circuit for energizing the motor and including said brushes, means for pressing the brushes against the commutator to close the circuit through the motor, means apart from the brushes for opening said circuit, and means for pressing the brushes against the commutator while the circuit is open to provide a brake.

4. In an electric motor having its brushes normally out of engagement with the commutator, a circuit for energizing the motor and including said brushes, means for pressing the brushes against the commutator to close the circuit through the motor, and means for simultaneously opening said circuit and pressing the brushes against the commutator to provide a brake.

5. In an electric motor having its brushes normally out of engagement with the commutator, a primary circuit for energizing the motor and including said brushes, means for pressing the brushes against the commutator to close the circuit through the motor, a solenoid for controlling the pressing means, a secondary circuit for energizing the solenoid, and means for opening the primary circuit and closing the secondary.

EVAN D. WILLIAMSON.